United States Patent [19]

Shirek

[11] Patent Number: 4,641,439

[45] Date of Patent: Feb. 10, 1987

[54] ROCK DIGGING APPARATUS

[76] Inventor: Frank A. Shirek, Rte. #1, Box 65, Adams, N. Dak. 58210

[21] Appl. No.: 704,705

[22] Filed: Feb. 25, 1985

[51] Int. Cl.$^4$ .............................................. A01B 43/00
[52] U.S. Cl. .................................... 37/2 R; 172/274; 414/739
[58] Field of Search ............... 172/448, 439, 274, 272; 171/63, 82, 141; 254/132; 37/2 R, 183 R; 414/920, 739, 732

[56] References Cited

U.S. PATENT DOCUMENTS

| | | | |
|---|---|---|---|
| 2,624,959 | 1/1953 | Anderson | 171/63 X |
| 2,806,303 | 9/1957 | Boyle | 37/2 R |
| 2,908,409 | 10/1959 | Hinders | 37/2 R |
| 3,103,076 | 9/1963 | Shultz | 172/448 X |
| 3,275,173 | 9/1966 | Kampert | 414/739 |
| 3,603,007 | 6/1971 | Naber | 171/63 |
| 4,264,252 | 4/1981 | Jennings | 414/920 |
| 4,372,063 | 2/1983 | Work | 37/2 R |

Primary Examiner—Richard J. Johnson
Attorney, Agent, or Firm—Robert E. Kleve

[57] ABSTRACT

The invention comprises an apparatus for digging obstructions out of the ground. The apparatus has a first frame adapted to be attached to the framework of a three point hitch connection on a tractor. The hitch connection has hydraulic means to raise and lower the hitch whereby the hitch will raise and lower the first frame. The apparatus has a second frame pivotally mounted to the first frame with digging members fixed on the second frame. The apparatus has hydraulic means for pivoting said second frame on its pivotal mounting to an angle whereby the first frame may be lowered and the digging members may be engaged into the ground at an angle to penetrate beneath an obstruction and may be pivoted upward to lift the obstruction out of the ground, a hook is pivotally mounted on said second frame to pivot down over said rock digging members to secure a rock on said members.

2 Claims, 6 Drawing Figures

ROCK DIGGING APPARATUS

This invention relates to rock or obstruction digging apparatus, more particularly, the invention relates to apparatus for digging rocks or obstructions out of the ground and/or conveying the same.

It is an object of the invention to provide a novel rock digging apparatus having two frames with one frame attached to a three part hitch of a tractor and the other frame having a rock digging member with the two frames pivotally connected together and hydraulically adjustable to pivot said second frame having the digging member relative to the first frame and tractor to an angle for digging beneath a rock and an adjustable back from that angle for lifting it above the ground.

It is another object of the invention to provide a novel digging apparatus for digging rock or other obstructions out of the ground.

It is another object of the invention to provide a novel rock digging apparatus for digging rock from the ground having two frames with the first frame pivotally connected to the tractor and the second frame pivotally connected to the first frame and with the second frame having rock digging members fixed thereto.

It is another object of the invention to provide a novel rock digging apparatus having two frames pivotally connected together.

Further objects and advantages of the invention will become apparent as the description proceeds and when taken in conjunction with the accompanying drawings wherein.

Briefly stated, the apparatus comprises a rock or other obstruction digging apparatus having a first and second frame. The said first frame being adapted to be attached to the framework of a three point hitch connection of a tractor wherein said hitch connection has hydraulic means to raise and lower the hitch to raise and lower said first frame with respect to the tractor, said second frame being pivotally connected to said first frame, a pair of rock digging members fixed on said second frame, hydraulic means to pivot said second frame relative to said first frame about said pivotal mounting, a hook pivotally mounted to said second frame, hydraulic means to pivot said hook on said second frame toward and away from said rock digging members, whereby said second frame may be pivoted relative to said first frame and ground level to penetrate said digging members into the ground beneath a rock and pivoted upward to lift the rock out of the gound and said hook may be pivoted down over said rock to secure said rock to said rock digging members.

Figure 1:
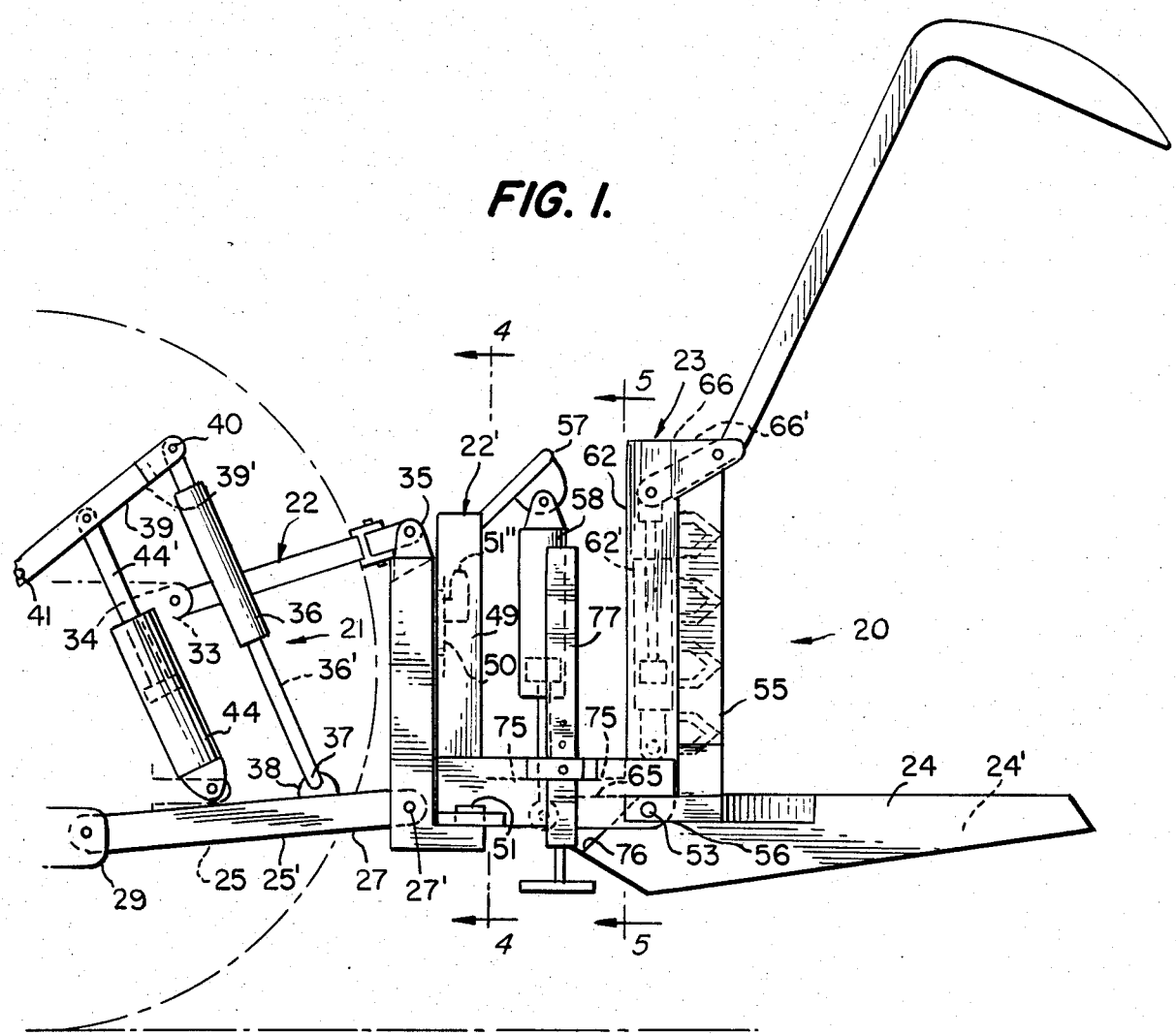
FIG. 1 is a side elevational view of the ock digging invention shown in operative position, attached to the three part hitch of a tractor.
Figure 2:
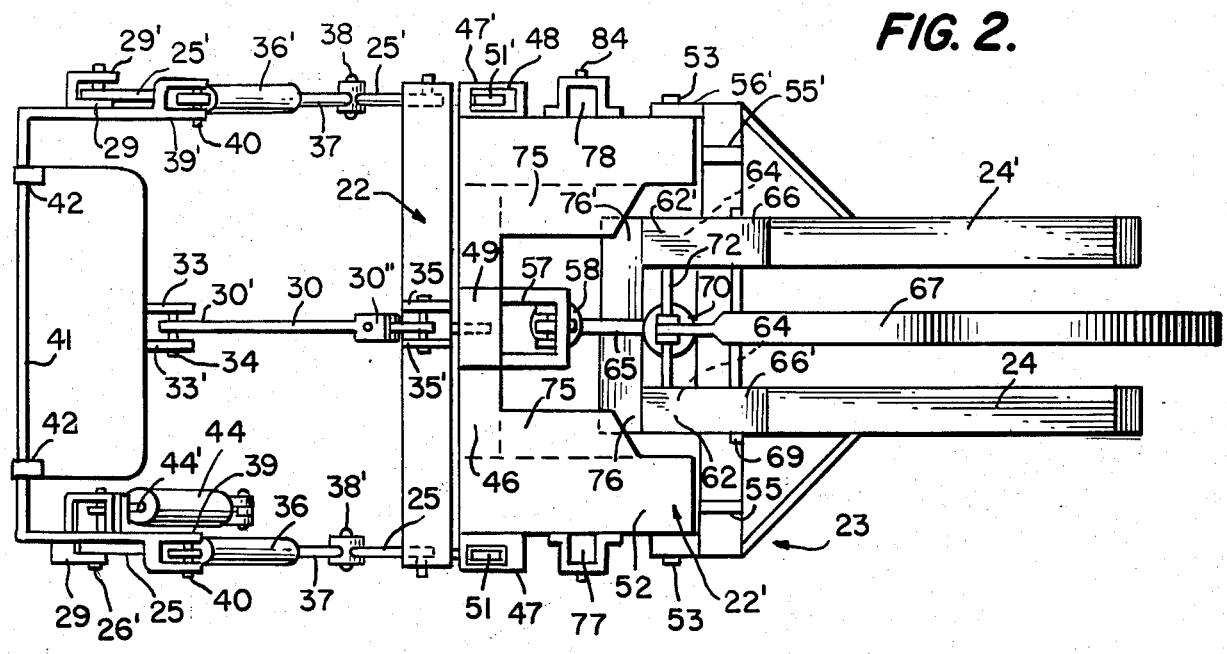
FIG. 2 is a top plan view.

Referring more particularly to the drawings in FIG. 1, the rock digging apparatus 20 is illustrated as being attached behind a tractor 21. The tractor has a conventional frame 22 mounted to be raised and lowered to the rear of the tractor. The apparatus 20 has a first frame 22' with the sub frame or first frame 22' detachably mounted to the adjustable frame 22 of the tractor. The apparatus has a second frame 23 pivotally mounted to the first frame 22' with a pair of rock digging members 24 and 24' fixed to the second frame 23.

The tractor 21 has a conventional pair of lever arms or rods 25 and 25' which are pivotally mounted at one end 26 to the tractor 21 and pivotally mounted at their other end by pins 27' to the conventional frame 22. The pins extend through bores in the ends 27 of arms 25 and are rotatable therein. The pivotal connection for the arms 25 and 25' at their ends 26 is formed by lugs 29 and 29' fixed on the tractor adjacent each arm 25 which lugs have pins 26' fixed in the lugs which are free to rotate in bores in the ends 26 of arm 25 and 25'.

A third lever arm 30 has one end 30 pivotally mounted to the tractor by a pair of lugs 33 and 33' which are fixed to the tractor and a pin 34 fixed in the lugs which is rotatable in a bore in the end 30' of the arm 30. The arm 30 is also pivotally mounted to the conventional frame 22. At its other end 30" by a pair of lugs 35 and 35' which are fixed to the frame 22 and a pin fixed to the lugs which is rotatable in a bore in the other end 30".

A hydraulic piston and cylinder is sometimes used in place of the arm 30. The lever arms 25 and 25' and the arm 30 form a conventional three point connection between the tractor and the frame 22.

A pair of arms 36 and 36' are pivotally connected at their lower ends 37 to the lever arms 25 and 25' at pivotal connections 38 and 38'. The upper ends of the arms 36 and 36' are pivotally connected to a pair of levers 39 and 39' on each side of the tractor by the pair of pins 40 fixed to the levers and rotatable in bores in the lever arms 36 and 36'. The lever arms 39 and 39' are fixed together at their other ends to a shaft 41. The shaft 41 is rotatably mounted on the tractor by a pair of mounting collars 42. A hydraulic cylinder 44 is pivotally mounted to the tractor and its plunger 44' is pivotally mounted to lever 39, intermediate its height, so that actuation of cylinder 44 acts to move the piston 44' to pivot the lever arms 39 and 39' clockwise and counterclockwise with and on the axis of shaft 41 to thereby raise and lower the arms 36 and 36' which thereby raises and lowers the arms 25 and 25' and arm 30 in parallel relation to one another, thereby raising and lowering the frame 22.

The sub frame 22' of the apparatus has a horizontal lateral beam 46 with a pair of rings 47 and 47'. The first frame 22' has U-shaped channels 52 and 52' fixed on each side of the horizontal beam 46 and which extend perpendicularly rearward from the beam 46. At the rear end of each channel 52 and 52' are a pair of pins 53 fixed to the channels. The frame 23 has four angle irons 54 fixed in parallelism to one another at spaced intervals between side plates 55 and 55' to form the frame 23. The rings 47 and 47' are fixed to the outer sides of channels 52 and 52'. The rings form two aperatures 48 and 48'. The sub frame 22' has a center column 49 fixed to the beam 46 and projecting upward with a vertical slot 50 in the front face of the column 49. The frame 22 has three projecting lugs 51, 51', and 51" which project rearward and upward. The lugs 51 and 51' are inserted in the rings 47 and 47' and the lug 51" is inserted in the slot 50 to detachably mount frame 22' to the frame 22. Frame 22' is held in fixed relation to the frame 22 by the weight of the frame 22 bearing down on the connections.

A pair of plates 56 and 56' are fixed to the lower end of vertical side plates 55 and 55' and extend forward toward the frame 22". The plates 56 and 56' have bores and the pins 53 are pivotally mounted in the bores of plate 56 and 56' to pivotally mount the frame 23 to the frame 22' about the axis of pins 53.

The frame 22' has a U-shaped rod 57 which is fixed to the upright column 49 and extends diagonally rearward and upward. A hydraulic cylinder 58 and piston 58' are mounted behind the frame 22'. The cylinder 58 is pivotally mounted to the rod 57 by a pair of lugs 59 and 59' which are fixed to the cylinder 58 and a lug 60 which is fixed to the rod which is fixed to the rod 57. A pin 61 which is fixed between lugs 59 and 59' is rotatable in a bore in rod 57 to thereby pivotally connect the cylinder 58 to the frame 22' about the axis of pin 61.

Immediately behind angle irons 54 of frame 23 are a pair of upwardly extending rectangular hollow columns 62 and 62'. The columns are fixed to the back of the angle irons 54 of the frame 23, parallel in length to the plate 55 and 55'. The rock digging member 24 and 24' are fixed to the bottom of the columns 62 and 62".

The second frame 23 has a lateral frame portion 63 which extends between the rear portions 64 and 64' of the rock digging members 24 and 24' and is fixed thereto. The rod 63 is pivotally mounted in the center bore in piston 58'. A center beam 65 is fixed to and extends forward from the lateral portion 63. The piston 58' of cylinder 58 has a pair of lugs fixed to its lower end that are pivotally mounted to the center beam 65 at pivot point 65' by a pin fixed in the lugs and rotatably mounted in bores in portion 63 to pivotally mount the piston 58' to the center beam 65 of frame 23.

At the upper end of each column 62 and 62' is rearward projecting portions 66 and 66'. A hook 67 at its rearward end 68 is pivotally mounted to the rear portion 66 and 66' by a pin 69 which is fixed in the hook at portion 68 with its outer ends rotatably mounted in bearing or bores in portions 66 and 66'.

A hydraulic cylinder 70 has a piston 70'. The piston 70' has a pair of lugs 68' and 68" at its rearward end and a pin 71 is fixed in the lugs and rotatable in a bore in the hook to pivotally connect the piston 70' of cylinder 70 to the hook 67.

The frame 23 has a rod 72 fixed between rod members 62 and 62'. A pair of lugs 73 and 74 are fixed to the cylinder 70 and are rotatably mounted on the rod 72 to pivotally connect the cylinder 70 to the frame 23.

Figure 3:
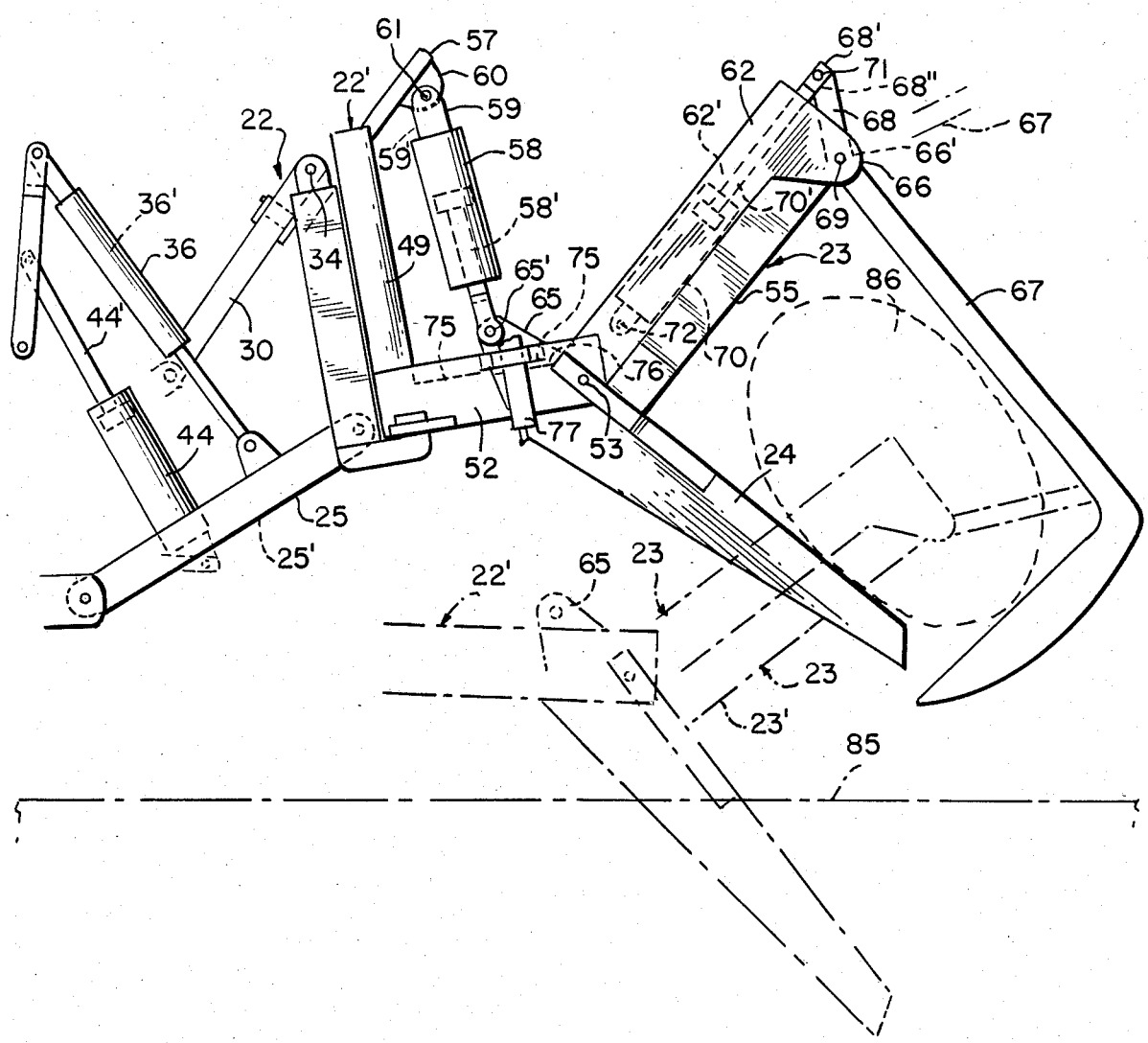
FIG. 3 illustrates the invention with the second frame pivoted at an acute vertical angle for more vertical entry of the rod digging members on the second frame into the ground.
Figure 4:
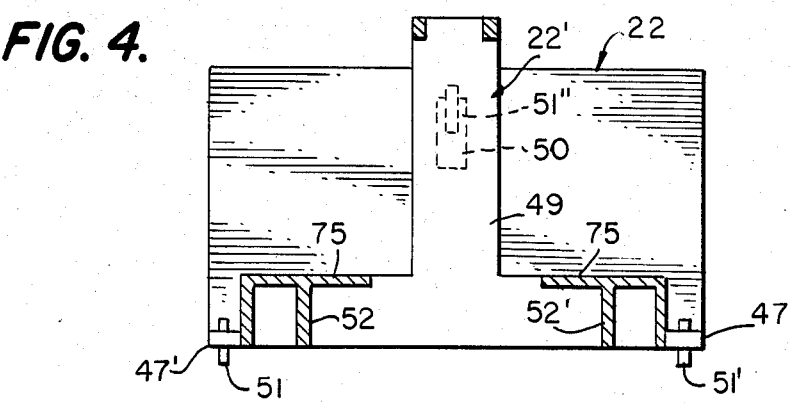
FIG. 4 is a cross-sectional view along line 413 4 of FIG. 1.
Figure 5:
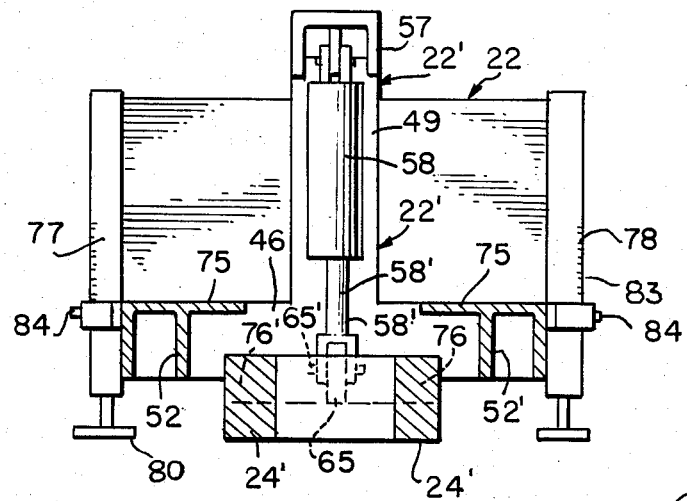
FIG. 5 is a cross-sectional view along line 5—5 of FIG. 1.
Figure 6:
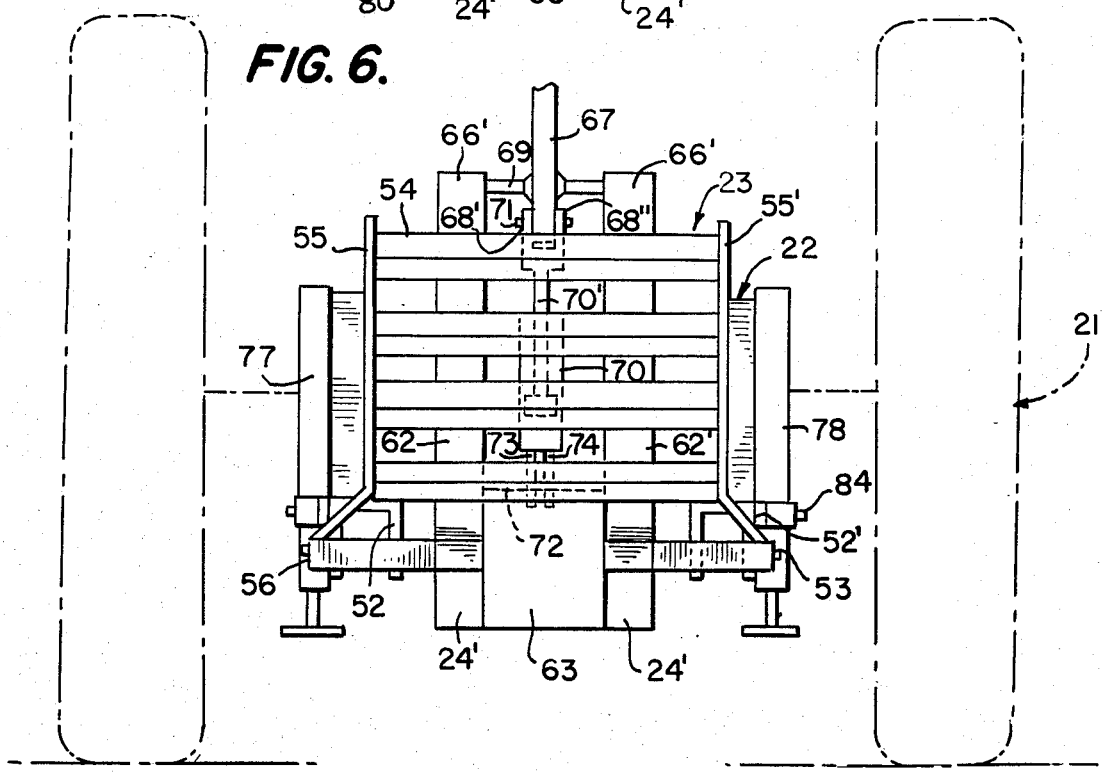
FIG. 6 is a front view.

The frame 22' has a pair of ledges 75 fixed to the U-channels 52 and 52' of the frame near the rear ends of rock digging member 24 and 24'. The rock digging members 24 and 24' of frame 23 has tapered rearward surfaces 76 and 76' on the lateral frame 63. The tapered surfaces 76 and 76' of frame 23 engage the ledges 75 on frame 22' to limit the pivotal movement of the rock digging members 24 and 24' of frame 23 with respect to frame 22'. When the frame 23 and rockrock digging members 24 and 24' have been pivoted to the acute angle illustrated in FIG. 3 with respect to frame 22', by the actuation of the cylinder 58 the tapered surfaces 76 and 76' engage the ledge 75 to limit and stop the members 24 and 24' and prevent further counterclockwise movement of the rock digging members 24 and 24' and frame 23 with respect to frame 22', as illustrated in FIG. 3.

The subframe 22' has a pair of legs 77 and 78 to support the frame 22', frame 23, rock digging member 24 and 24' and associated components on the ground separate from the frame 22.

The bracing legs 77 and 78 are mounted to each side of frame 22'. The bracing legs each have a rectangular rod portion 79 and flat portion 80 threaded into the bottom of rod 79. A collar 81 is fixed to the side of the U-shaped channels 52 and 52'. The collar 81 has a bore 82 therethrough, with a plurality of spaced bores 83 in the rod portion 79. The rod portions 79 of legs 77 and 78 may be slid to a desired position upward or downward in the collars 81 and a pin 84 is inserted into the bore 82 in the collar and the nearest spaced bore 82' in the rod portion to lock the legs 77 and 78 in the desired position.

The raising and lowering of the arms 25 and 25' and 30 by actuating of the hydraulic cylinder 44, raises and lowers the frame 22 and sub frame 22' attached thereto and raises and lowers the frame 23 attached to frame 22' and the rock digging members 24 and 24' and hook and other associated components thereon on a conventional pivoting parallelogram path upward and downward.

The rock digging and conveying apparatus 20 operates as follows:

The apparatus 20 will be positioned separately on the ground when not in use separate from the conventional frame 22 of the tractor. The apparatus 20 will be supported on the ground at the front end by the pair of adjustable legs 77 and 78 resting on the ground and by the rock digging member 24 and 24' at the rearward end resting on the ground. When it is desired to attach the apparatus 20 to the frame 22 of the tractor. The tractor will be backed up toward the rings and slot connection of the sub frame until the lugs 51 and 51' are beneath the rings 47 and 47' and the lug 51" has slid into the slot 50 of the sub frame whereby the hydraulic cylinder 44 is activated to raise the frame 22 thereby raising the lugs which engage and lock into the rings and slot as illustrated in FIG. 3 to form a fixed three point connection between frame 22 and 22'.

The hydraulic cylinder 44 of the three point connection between the tractor and the frame 22' will be further activated to raise the frames 22, 22', and 23 of the apparatus spaced above the ground, as illustrated in FIG. 1.

Whereupon the tractor will be moved to a position where a rock is located in the ground that the operator desires to dig out of the ground.

The tractor will be positioned in front of or forward of the rock, the frame 23 will be pivoted to an angle relative to frame 22' and the frame 22 of the tractor by actuating the hydraulic cylinder 58 retracting the piston 58' to pivot the frame 23 to an acute angle with respect to frame 22, such as illustrated in FIG. 3 until the stop members 76 and 76' engage the stop member 75 on frame 22'. The operator will then pivot the hook 67 counterclockwise, by actuating the cylinder 70 telescoping piston 70', to pivot the hook from its position shown in solid lines in FIG. 3 to its position shown in dashed lines in FIG. 3 (or solid line in FIG. 1). The hook will be left in this position while the apparatus is lowered for the digging, with the hook pivoted up away from the digging members 24 and 24'.

Whereupon the operator will actuate the hydraulic cylinder 44 of the three position hitch to lower the apparatus with the hook pivoted up and with the rock digging members 24 and 24' at an acute angle while backing up the tractor, until the members 24 and 24' engage the ground in front of the rock causing the rock digging members to penetrate into the ground immediately in front of the rock and travel into the ground at an angle under the ground as the tractor moves backward. The engagment of the rock digging members with the ground as the tractor backs up is at an angle to hold the rock digging members 24 and 24' clockwise against the stop 75 at their acute angle as the members penetrate into the ground. The rear surfaces 76 and 76' of the members 24 and 24' of the frame 23 engages a fixed plate 75 as the frame 22' to provide a stop so that the rock digging member can not pivot further beyond the angle as illustrated in FIG. 3. This engagement provides a positive stop so that the hydraqlic cylinder 58 does not have to hold the rock digging member at that angle when they penetrate into the ground and it thereby prevents overloading of the cylinder 58. The reaction of the members 24 and 24' with the ground as they penetrate acts to hold the rock digging members at their acute angle and against the stop.

FIG. 3 in dashed lines illustrates the apparatus after the digging members have penetrated into the ground.

The movement and weight of the tractor also acts against the apparatus to apply pressure or weight to cause the members 24 and 24' to penetrate into the ground.

The rock members 24 and 24' will continue to penetrate into the ground as the tractor moves backward, because of the angle and the positive stop until the rock is positioned on the members 24 and 24' near or against the back 23' of frame 23.

The tractor may be moved back and forth to loosen the rock at this point. Thereafter, the hydraulic cylinder 70 will be activated to pivot the hook down over the top of the rock and the hydraulic cylinder 58 will be activated to project the piston 58' to pivot the frame 23 back to a parallel position with respect to frame 22 as illustrated in FIG. 1, thereby lifting the rock out of the ground.

Whereupon the hydraulic cylinder 44 will be activated to raise the frame 22 and 22' and connecting frame 23 and hook the rock above the ground with the rock on the frame 23 to a position such as is illustrated in FIG. 1, though with the hook pivoted down over the rock as illustrated in FIG. 3 with respect to the frame 23. Then the tractor may be driven to a location where it is desired to unload the rock.

The hydraulic cylinder 44 will be activated to lower the frames 22, 22', and 23 somewhat if desired to place the frame 23 and the hydraulic cylinder 58 will be activated to pivot the acute angle with the rock digging member 24 and 24' touching the ground. Then the hydraulic cylinder 70 will be activated to retract the piston 70' to pivot the hook counterclockwise up away from the rock to its position shown in FIG. 1. This will release the rock and allow it to roll down the inclination of members 24 and 24' and roll off members 24 and 24' and then the tractor may be driven forward at that time to remove the rock digging members from beneath the rock.

The ground level is referred to by number 85 and the rock is referred to by number 86.

Thus it will be seen that a novel rock digging apparatus has been provided that provides a versatile operation whereby the two frames can be pivoted with respect to one another and separately from the raising and lowering by the three part hitch so that the digging member can be placed at a more effective angle for penetrating into the ground and then shifting to a different angle for lifting the rock out of the ground and then being able to raise the rock and frame further above the ground for transporting the rock with a hook to mount the rock on the second frame that is movable with the movement of the second frame and pivotably independent for holding the rock on the frame.

It will be obvious that various changes and departures may be made to the invention without departing from the spirit and scope thereof and accordingly, it is not intended that the invention be limited to that specifically described in the specification or as illustrated in the drawing but only as set forth in the appended claims.

What is claimed is:

1. A load moving apparatus comprising a first frame, a second frame, a support frame having lugs at three points, said support frame being adapted to be pivotally mounted to a three point connection of a tractor having fluid actuated means to raise and lower the three point connection with respect to the tractor, said first frame having lug receiving means to detachably receive the lugs of the support frame, whereby actuation of the means to raise and lower the three point connection may detachably engage the support frame with the first frame to support the first frame thereon to raise and lower said first frame with respect to said tractor, said second frame being pivotally mounted to said first frame whereby raising and lowering of said first frame will raise and lower the second frame, a fluid actuated piston and cylinder means connected between said first and second frame which upon actuation acts to selectively pivot said second frame with respect to said first frame about said pivotal mounting, a plurality of load lifting spikes mounted to said second frame and projecting rearward therefrom, a pivotally mounted grapple on said second frame, a fluid actuated piston and cylinder means connected between said second frame and said grapple which upon actuation acts to selectively pivot said grapple on its pivotal mounting for encircling over a load once located on said spikes.

2. A load moving apparatus and support frame for attachment to a tractor having a three point connection with fluid actuation means to raise and lower the three point connection with respect to the tractor, said support frame being adapted to be pivotally mounted to the outer ends of said three point connection to be raised and lowered by said three point connection, said apparatus comprising a first frame, a second frame, said second frame being pivotally mounted to said first frame, said support frame and said first frame having a lug and slot detachable connection whereby actuation of the means to raise and lower the three point connection may detachably engage the support frame with the first frame to support the first frame thereon to raise and lower the first frame with respect to the tractor and with the raising and lowering of said first frame raising and lowering said second frame, a fluid actuated piston and cylinder means connected between said first and second frame whereby actuation of said piston and cylinder means acts to pivot said second frame with respect to said first frame about said pivotal mounting, load lifting spike means projecting rearward from said second frame, a pivotally mounted grapple mounted to said second frame, a fluid actuated piston and cylinder means connected between said second frame and said grapple whereby actuation of said fluid actuated means acts to pivot said grapple toward and away from said spike means to encircle a load on said spike means.

* * * * *